June 23, 1953    W. WOERNER    2,642,759
BORING MACHINE SPINDLE CONSTRUCTION
Filed May 9, 1950
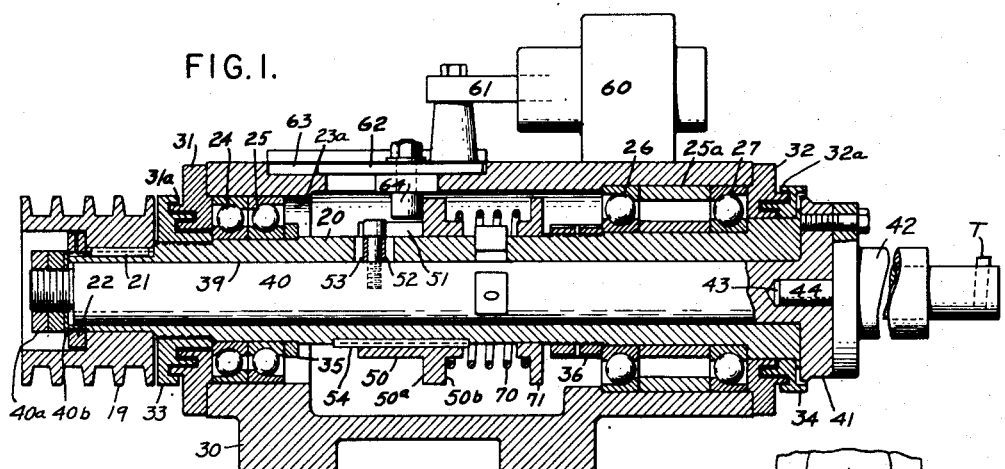
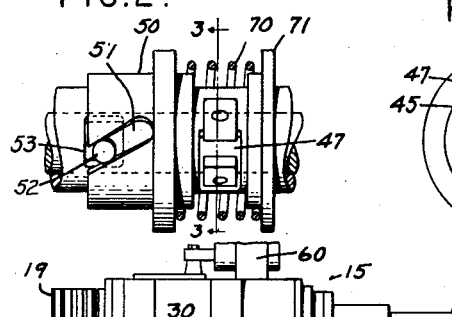
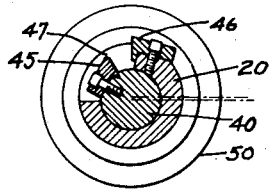
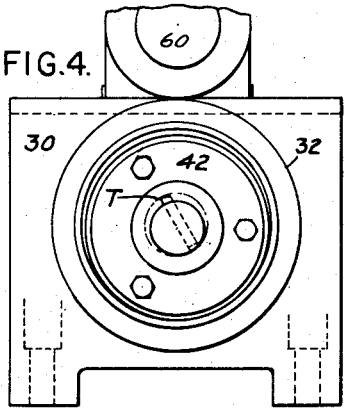
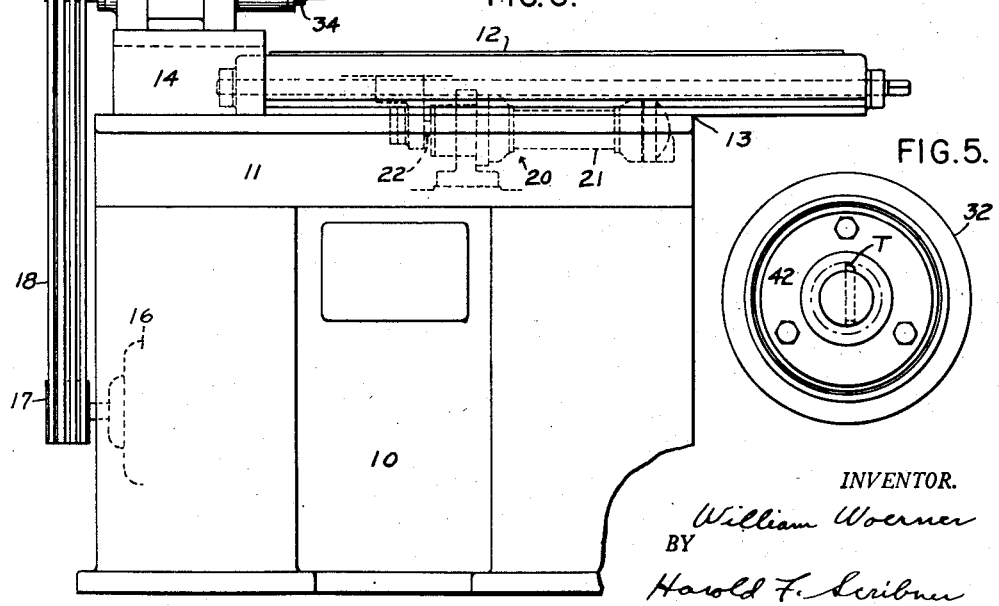
INVENTOR.
William Woerner
BY
Harold F. Scribner Patented June 23, 1953

2,642,759

UNITED STATES PATENT OFFICE 2,642,759

BORING MACHINE SPINDLE CONSTRUCTION

William Woerner, Greenbrook, N. J., assignor to Massari Bros. Machine Company, a partnership trading under the firm name of Wadell Equipment Co., Garwood, N. J.

Application May 9, 1950, Serial No. 160,890

7 Claims. (Cl. 77—3)

The present invention relates to precision boring machines and more particularly to a method and means for eliminating tool score marks in the finished bore whereby to attain superior finishes, with a high degree of accuracy, and at appreciable savings in time.

In the conventional boring machine the cutting tool revolves and the work is stationary. Relative axial movement between the tool and the work causes the point of the tool to cut a true cylinder in the workpiece. After the boring operation is completed the rotary motion of the tool is stopped and axial movement between work and tool in the opposite direction removes the tool from the finished bore. However, since tooling forces introduce a slight amount of spring or wind up in the several machine elements, which is unleashed when the cutting operation is finished, backtracking of the tool on and relative to the finished surface, causes the tool to score the workpiece. In some classes of work, the scoring is not objectionable but in others, for example cylinder work for pistons, a scored cylinder is highly objectionable. Moreover, in all cases and classes of work, backtracking of the tool over the work, is harmful to the tool for the reason that the fine cutting edge thereof is frequently broken off if allowed to drag on the workpiece. In an effort to avoid the difficulties mentioned, machine designers have conceived of more or less complex mechanisms whereby the rotary motion of the tool is brought to a stop at a particular angular position and then the near surface work is shifted laterally away from the tool point and then the tool is withdrawn. In such arrangements the tool moves in the air, its cutting edge maintained, and there is no scoring of the work.

The present invention undertakes to provide a solution to the problem in a manner that requires neither the stopping of the tool nor the lateral shifting of the work, to the end of not only producing scoreless work and of prolonging tool life but for the further purpose of increasing the hourly production rate of the boring machine so equipped.

In attaining the objectives of the invention it is proposed to construct a boring machine spindle in two parts namely an inner spindle member and an outer sleeve member both of which normally are rotated together. The nose end of the spindle is adapted to carry and support the tool, for example, a boring bar, and the quill or spindle sleeve is mounted in bearings and constructed to function as the driving member for the spindle. The axis of the spindle member is disposed parallel to but offset slightly from the axis of the sleeve, and the boring bar or at least the cutting tip of the tool is mounted to the spindle in such angular phase relation that when the spindle is being driven and performing a tooling operation, the cutting point of the tool revolves in a true circle of the precise bore diameter required. However, when the spindle and its sleeve are rotated a part of a turn relative to each other, the cutting point of the tool is caused to move inwardly (or outwardly) from its previous position and the path it then may inscribe, if combined rotation is continued, will be a true circle of smaller or greater diameter. In most boring machine adaptations the phase relation of the parts will be such that the aforesaid relative rotary movement between the spindle and its sleeve will cause the tool point to be retracted from its original position, and when retracted may be withdrawn from the finished bore without tracking on the surface thereof and without damage to the cutting point of the tool.

Relative rotary movement between the spindle and the sleeve may be effected by the inertia of the part or in various other ways, and I have found it preferable to employ a pin and an inclined-slot mechanism operable from the exterior of the sleeve and its housing for the purpose. In the preferred embodiment of the invention the pin member is embedded in the spindle and projects radially therefrom through a clearance hole in the sleeve, and its outer end into operative engagement with a helical slot formed in an axially shiftable spool element. The spool surrounds the sleeve and is keyed thereto. Axial shifting of the spool thus causes the pin to oscillate whereby the inner spindle is caused to rotate a limited distance forwardly or backwardly relative to the position of the sleeve. The spool member may be actuated axially by suitable means, and if desired, in timed relation with the machine cycle so that retraction of the cutting point of the tool is automatic. I prefer, however, to spring load the spool in one direction and to actuate it in the other direction as by means of a solenoid whose control circuit can be nicely controlled by relays and limit switches positioned along the path of travel of the work bed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawing is a longitudinal sectional view of a boring machine spindle embodying the invention, with the parts illustrated in the position assumed when the tool point is retracted relative to its normal cutting position.

Fig. 2 is a plan view of a portion of the spindle and sleeve and the shifting mechanism.

Fig. 3 is a vertical sectional view taken substantially along line 3—3 of Figure 2.

Fig. 4 is a front end view of the spindle with the tool point retracted and indicated as inscribing an imaginary circle shown by broken line.

Fig. 5 is a view of the spindle end with the tool point extended and indicated as inscribing a larger imaginary circle represented by broken line.

Fig. 6 is an elevational view of a representative type of boring machine embodying a spindle construction according to the invention.

With reference more particularly to Fig. 6, the boring machine illustrated includes a base member 10, and a bed 11 which supports a reciprocable work support 12 mounted on matching guides 13. One end of the bed also supports a fixed bridge member 14 upon which the boring spindle assembly 15 is firmly mounted. The bed and base of the machine contain conventional mechanisms for reciprocating the work support and for revolving the tool spindle and as such instrumentalities in themselves form no part of the instant invention they have in the interests of clarity been omitted from the drawing. Suffice it to say that a motor, indicated at 16, imparts rotary movement to the tool spindle through the intermediary of motor pulley 17, belts 18, and spindle pulley 19. The work support 12, indicated herein as being reciprocated by hydraulic means indicated at 20 and which includes piston and cylinder elements 21 and 22, connected respectively to the bed 11 and support 12, and which are actuated and controlled in a manner well known in the art. In machines of the character typified, the work to be precision bored is securely mounted, usually in a jig or fixture, on the surface of the table 11, and traversed slowly toward the fixed but revolving tool spindle, and more slowly as the tool bores out the hole desired to be formed in the workpiece. Upon completion of the boring operation, the tool point is radially retracted in a manner hereinafter described, and the workpiece and table recede to the starting position, and are stopped. The finished piece is then removed, the fixture reloaded and the cycle repeated. After the finished piece is clear of the tool on the retracting movement and before the next workpiece arrives in tooling position relative to the boring tool, the latter may be caused to again resume its original outward precision position so that the succeeding workpiece will be bored the same size as the previous piece.

Referring now more to the spindle structure illustrated in Figs. 1, 2, and 3, the spindle pulley 19 is illustrated as keyed and clamped directly to the rear end of spindle sleeve 20 as by key 21 and clamp nut 22. The spindle sleeve progresses in outside diameter toward the forward or nose end, and is journaled in antifriction radial-thrust bearings 24, 25, 26 and 27 whose outer races have a press fit in bores 23a and 25a provided in a spindle housing 30. The bearings are retained in place in the housing by end plates 31 and 32 which are secured to the housing by suitable screws (not shown). Each end plate has its outer surface formed with a series of annular ribs and grooves 31a, 32a which interdigitate with complementary ribs and grooves formed on the inner face of spindle collars 33 and 34. The spindle collars may be threaded or otherwise secured to the spindle and normally revolve therewith whereby the interdigitating rings and grooves provide an effective seal for the lubricant supplied to the spindle bearings. Commercial oil seals for the spindle bearings may, of course, be used. The inner races of the antifriction bearings abut against fixed and adjustable shoulder elements 35 and 36 respectively whereby the spindle sleeve is journaled for free rotary motion without axial shift relative to the housing 30.

The sleeve 20 is formed with a longitudinally extending bore 39 adapted to receive a complementary spindle member 40. The axis of the spindle bore 39 is eccentrically positioned a slight amount relative to the rotary axis of the spindle. The forward end of the spindle is flanged as at 41, to overlay the end of the spindle sleeve 20, and provides a relatively large surface to which a boring tool indicated at 42 may be secured. Eccentrically located with relation to the longitudinal axis of the spindle member, a bore 43 is provided in the spindle extending inwardly from the flanged end thereof, which bore functions as a pilot hole by means of which the boring tool may be centered. Each boring tool will be provided with a pilot 44 for that purpose. Assuming that the parts are stationary and the eccentricity of sleeve bore 39 is maximum at 6 o'clock, and the eccentricity of the pilot bore 43 in the spindle (which is the boring tool axis) is at 12 o'clock, the algebraic sum of the two eccentricities equal zero and the axis of the boring tool is true with the running axis of the spindle sleeve. In this position the tool point should be positioned in the holder at 6 o'clock, or directly opposite the eccentricity of the pilot bore. In other words when the parts are related as stated the boring bar and the tool T will run true with the outside diameter of the sleeve, when both sleeve and spindle are rotated together. However, assuming the parts again to be stationary and the eccentricity of the sleeve bore positioned at 6 o'clock, and the spindle relatively rotated therein so that the eccentricity of the pilot bore and tool holder is for example at 10 o'clock or at 2 o'clock, the tool point T, which will then be at 4 or 8 o'clock, is moved radially inwardly to a new position, and if both sleeve and spindle then are rotated together, the tool point will inscribe a circle of a smaller radius than before. This means that with a spindle constructed as described, the tool point may, upon limited rotation relative to the spindle sleeve, be given either of two orbits of travel, one large and one small, the difference depending upon the extent of eccentricity initially provided and the degree of relative angular movement permitted between the sleeve and the spindle. Whether the tool point enscribes a smaller circle when the spindle is advanced relative to the sleeve, or a larger circle, depends upon the phase relation of the tool point with respect to the eccentricity of the pilot hole. If they are opposite, as above explained, the point of the tool recedes when the spindle is advanced, if they are coincident the tool point will advance, diametrally, as the spindle is advanced circumferentially.

For precision boring operations wherein tool marks are to be avoided, the tool point should be related opposite the pilot eccentricity, and so that interchange of one boring tool for another and the mounting thereof in correct phase relation on the spindle end may be readily effected, the spindle flange 41 should carry an appropriate zero mark, or reference point, such as a scribe line, and the flange of the boring tools be similarly marked so that correct phase relations are established somewhat automatically as the parts are assembled.

Endwise movement of the spindle relative to the sleeve is prevented in this embodiment by means of a pair of lock nuts 40a threaded to the rear end of the spindle and operating, through a thrust washer 40b, against the surrounding end of the spindle sleeve.

As herein above indicated the spindle sleeve 20 is the driver for the spindle 40, and in the instant embodiment the power is transmitted normally through a pair of lug elements 45 and 46, the former being interlocked with the spindle 40 and the latter interlocked with the sleeve 20. The drive lugs are fastened to their respective parts by suitable screw and pin elements, and a radial slot 47 is formed in the spindle sleeve 20 through which the spindle lug 45 may operate. In the position of the parts illustrated in Fig. 3, the lugs are illustrated spaced apart and in non-driving relation, this being the position assumed when the spindle is advanced relative to the sleeve and the tool point is retracted. Normally the lugs are in engagement with one another so that rotary motion imparted to the spindle sleeve is transmitted to the spindle through said anchored lugs. By providing removable lugs as the drive transmitting elements, either or both may have their engaging faces ground or otherwise finished to obtain the precise phase relations between the sleeve and spindle whereby the tool point is caused always to take up a definite position in space and thus rendering repeat precision borings possible.

The extent that the tool point will be moved radially on relative rotation of the sleeve and spindle is a function of the amount of eccentricity between the several components and the angular movement provided for between them. I have found that by providing $\frac{1}{32}''$ eccentricity and approximately 30° of angular movement, the cutting point of the tool will be retracted but a few thousandths of an inch, which is ample for the purpose of machining precision bores without scoring the work or withdrawing of the tool. The mentioned specifications may of course be varied or altered to suit particular requirements.

Figs. 1 and 2, illustrate more clearly a preferred form of means for effecting relative angular movement between the spindle and the sleeve which comprises essentially a shiftable spool member 50 having a helical slot 51 formed therein, and a pin element 52 fastened to and radiating from the spindle 40 and operatively engaged in the spool slot 51. The pin 52 operates through a clearance hole 53 provided in the sleeve 20. The spool 50 is operatively keyed to the spindle sleeve as by a key 54 and rotates with the sleeve. As the spool is moved one way or the other on the spindle sleeve the helical slot 51 therein causes the pin 52 to advance or retract the spindle 40 circumferentially relative to the drive sleeve 20.

Any suitable means may be provided to effect endwise movement of the spool 50, either manually or mechanically in timed relation with other machine motions, but I have found it effective to provide an electrically operated solenoid 60 having a reciprocable armature 61 for the purpose. The armature 61 is connected with a slide 62 mounted in guideways 63 provided in this instance by the spindle housing. The underside of the slides carries an actuating pin 64 positioned to engage the face 50a of the flange of the spool 50. When the solenoid is energized, the spool 50 is shifted to the position represented in Fig. 1, and the pin and helical slot connection 52, 51, advances the spindle circumferentially relative to the drive sleeve, the normally abutting drive lugs 45 and 46 become separated and the cutting tool point is retracted a few thousandths of an inch. If rotary motion of the sleeve is continued, the power is transmitted to the spindle through the spool 50 and the pin 52. However, when the parts are so related the cutting tool being withdrawn is under no cutting load and the pin and helical slot drive connection is well able to carry the load of an idling spindle. If the power drive to the spindle sleeve is discontinued after the boring operation is finished, the inertia of the spindle 40 tends to advance the spindle relative to the sleeve and little effort is required to shift the spool 50, and the latter may be omitted. Similarly when power is again applied to the spindle sleeve, it will at once overtake the spindle and the drive continues thru the lugs as before. The pin-and-slot connection, however, renders tool retraction and expansion definite and certain and is to be preferred. When the solenoid 60 is deenergized the slide 62 moves left from the position shown in Fig. 1, under the force of a compression spring 70 reacting against the side 50b of the spool flange. The other end of the spring abuts a flanged member 71 carried by the sleeve. In this construction the spring 70, flanged member 71, spool 50 and the spindle sleeve 20 all rotate together, and the spring is of sufficient magnitude as to always restore and maintain the drive lugs 45 and 46 in firm abutting relation when the solenoid is deenergized.

The control circuit for the solenoid 70 may follow standard conventions and incorporate table-dog-operated limit switches and relays commonly used to effect cyclic operation of machine mechanisms in accordance with a prearranged machine cycle. In the machine represented here such devices have not been illustrated. From the foregoing it will be perceived that a spindle assembly may be constructed which is not only sturdy, compact and self-contained but which incorporates tool bit retraction means in a manner conducive of repeat boring operations with extreme accuracy and with a higher degree of efficiency than has been possible to attain heretofore.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A spindle assembly for a machine tool comprising a housing, a spindle sleeve member rotatably journaled in the housing, a spindle journaled in the sleeve for angular adjustment relative to the sleeve about an axis eccentric to the axis of rotation of the sleeve in the housing, spindle driving abutments carried in part by said sleeve and in part by the said spindle adapted when engaged to limit the extent of angular adjustment of the spindle relative to the sleeve and to transmit drive power from the sleeve to the spindle, means for mounting a tool to said spindle including tool centering means constructed and arranged eccentric to the axis of the spindle so that the tool is caused to extend radially outwardly to its normal cutting position when the said driving abutments are in driving relation and to a position radially inwardly therefrom when said abutments are disengaged, means independent of said driving abutments for adjusting said spindle angularly relative to said sleeve selectively to a position wherein said abutments are engaged and said tool is extended and to a position whereat said driving abutments are disengaged and said tool is withdrawn radially inwardly to a normally ineffective position, and means to revolve said sleeve.

2. The combination of claim 1 in which said abutment elements are separate elements removably secured to the sleeve member and to the spindle respectively, and in which the sleeve member is provided with an annular opening through which the spindle secured abutment is caused to project.

3. The combination of claim 1 in which said means independent of said driving abutments for adjusting the spindle angularly relative to the sleeve comprises a shiftable spool element mounted on said sleeve for rotation therewith and for axial adjustment therealong, said spool element having a helical slot formed therein, a pin member extending radially from the spindle into cooperative relation with walls of said helical slot in the said spool, said sleeve member having an annular shaped opening therein for the free passage of said pin in all angular positions of the latter, and means operable at will to shift said spool axially whereby to effect angular movement of the spindle relative to said sleeve and to position said abutments in driving or non-driving relation.

4. The combination of claim 3 in which said spool is spring tensioned in one direction and said means operable at will operates in opposition to the said spring to shift the spool in the opposite direction.

5. A boring machine spindle assembly combining a housing, a spindle sleeve member rotatably journaled in the housing, power means for rotating said spindle sleeve, a spindle journaled in the sleeve for angular adjustment relative to the sleeve about an axis accentric to the axis of rotation of the sleeve in the housing, means carried in part by said sleeve and in part by the said spindle adapted when rendered effective to rotationally drive the spindle from the sleeve, means for mounting a tool to said spindle including tool centering means constructed and arranged eccentric to the axis of angular adjustment of the spindle so that the tool is caused to extend radially outwardly to a normal cutting position when the said spindle driving means are effective and to a position radially inwardly therefrom when said spindle driving means rendered ineffective, means independent of said spindle driving means for adjusting said spindle angularly relative to said sleeve selectively to a position wherein said spindle driving means are effective, and said tool is extended to normal cutting position and to a position whereat said spindle driving means are ineffective and said tool is withdrawn radially inwardly to an ineffective position, and means including a non-rotatable member mounted exteriorly of the said housing for effecting angular adjustment of said spindle relative to said sleeve.

6. The combination of claim 5 in which said means for adjusting the spindle angularly relative to the sleeve also includes a shiftable spool element mounted on said sleeve for rotation therewith and axial adjustment therealong said spool element having a helical slot formed therein, a pin member extending radially from the spindle into cooperative relation with walls of said helical slot in the said spool, said pin and spool member being constructed and arranged so that the driving power is transmitted from said spindle sleeve to the eccentrically mounted spindle solely by the said spindle driving means.

7. A boring machine spindle assembly comprising a housing, a spindle sleeve member rotatably journaled in the housing, a spindle journaled in the sleeve for angular adjustment relative to the sleeve about an axis eccentric to the axis of rotation of the sleeve in the housing, spindle driving abutments carried in part by said sleeve and in part by the said spindle adapted when engaged to limit the extent of angular adjustment of the spindle relative to the sleeve and to transmit drive power from the sleeve to the spindle, means for mounting a tool to said spindle so that the tool is caused to extend radially to a given position when the said driving abutments are in driving relation and to another outward position when said abutments are disengaged, means entirely separate from said driving abuments for adjusting said spindle angularly relative to said sleeve selectively to a position wherein said abutments are engaged and said tool is in one outward position and to a position whereat said driving abutments are disengaged and said tool is moved radially to the other outward position, and means for rotating said spindle sleeve.

WILLIAM WOERNER.

References Cited in the file of this patent

UNITED STATES PATENTS

| Number | Name | Date |
|---|---|---|
| 2,058,360 | Schmidt | Oct. 20, 1936 |

FOREIGN PATENTS

| Number | Country | Date |
|---|---|---|
| 3,098 | Australia | Aug. 3, 1927 |